United States Patent [19]

Kemp

[11] Patent Number: 4,899,980
[45] Date of Patent: Feb. 13, 1990

[54] BALL VALVE

[75] Inventor: Willard E. Kemp, Houston, Tex.

[73] Assignee: Kemp Development Corporation, Houston, Tex.

[21] Appl. No.: 295,744

[22] Filed: Jan. 10, 1989

[51] Int. Cl.$^4$ ............................................. F16K 5/06
[52] U.S. Cl. ...................................... 251/175; 251/174
[58] Field of Search ................ 251/172, 174, 175, 315

[56] References Cited

U.S. PATENT DOCUMENTS

| | | |
|---|---|---|
| 3,386,669 | 6/1968 | Petter et al. .................... 251/172 X |
| 3,394,915 | 7/1968 | Gachot . |
| 3,548,858 | 12/1970 | Wofensperger . |
| 4,071,220 | 1/1978 | Iino ..................................... 251/174 |
| 4,385,747 | 5/1983 | Renaud, Jr. et al. . |
| 4,460,012 | 7/1984 | Koumi et al. . |
| 4,502,663 | 3/1985 | Huber . |
| 4,557,461 | 12/1985 | Gomi et al. . |
| 4,579,316 | 4/1986 | Velan . |
| 4,580,763 | 4/1986 | Velan . |
| 4,747,578 | 5/1988 | Kivipelto et al. . |
| 4,753,443 | 6/1988 | Nicholson . |

Primary Examiner—John Fox
Attorney, Agent, or Firm—Dodge, Bush & Moseley

[57] ABSTRACT

A ball valve (10) has a ball valve member (34) mounted for floating movement in a valve chamber (32) between an upstream metal seat (102) and a downstream metal seat (104). Each metal seat (102, 104) fits within a recess (100) and has a body portion (110) of a generally uniform thickness adjacent an opposed shoulder (108) with a lip (114) about its inner circumference for sealing against spherical surface (40) of ball valve member (34) at all times. Body portion (110) acts as a Belleville spring and spaces lip (114) from adjacent shoulder (108) at low fluid pressures. A bearing portion (118) has an arcuate seat (120) spaced from spherical surface (40) at low fluid pressures but contacting spherical surface (40) at high fluid pressures. A flexible connector (118) of a relatively thin uniform thickness extends between bearing portion (118) and body portion (110). The stem (36) has a Belleville spring (86) exerting a compressive loading against a packing (82) and a thrust bearing (88) is mounted outwardly of the packing (82) between stem shoulder (52) and the outer clamping plate (72).

9 Claims, 2 Drawing Sheets

BALL VALVE

BACKGROUND OF THE INVENTION

This invention relates to a ball valve and more particularly to an improved metal seat design for a so-called floating ball valve.

Floating ball valves include a spherical ball valve member mounted within a valve chamber of the valve body for limited floating movement between upstream and downstream seats on opposed sides of the ball valve member. As compared with so-called trunnion mounted ball valves in which the spherical ball valve member is mounted on upper and lower trunnions for rotation and thus is fixed against any axial movement along the longitudinal axis of the flow passages, a floating ball valve moves in a direction along the longitudinal axis of the flow passages between opposed seats and is limited by such seats to a relatively small predetermined axial movement. As a result, when the ball valve member is in closed position and a high inlet fluid pressure exists, the ball valve member is moved against the downstream seat under a substantial force proportional to the inlet fluid pressure.

One of the problems associated with metal seat designs for floating ball valves is in the design of a seat which seals effectively at low fluid pressures, such as 5 psi, for example, and also seals effectively at high fluid pressures, such as 2000 psi, for example.

Heretofore, various types of metal seats have been provided for floating ball valves including metal seats which shift or rock into a sealing relation upon the application of a high fluid pressure against the ball member, with the seat recess being formed or shaped to accommodate or assist such movement. For example, U.S. Pat. No. 4,385,747 dated May 31, 1983 shows a metal seat mounted within a recess for facilitating movement of the seat under certain pressure conditions.

An example of another metal seat construction for a floating ball valve is shown in U.S. Pat. No. 4,557,461 dated Dec. 10, 1985 which has a metal seal of a substantial solid cross-section with a tapered and flexible lip extending therefrom for sealing against the ball valve member at low temperatures. While the lip is flexible, the remainder of the metal seal does not appear to be flexible to any significant degree.

SUMMARY OF THE INVENTION

The present invention is directed to a floating ball valve having an improved metal seat design and an improved mounting means for the stem utilized for rotating the floating ball valve member. The metal seat design includes a one-piece metal seat mounted within a valve body recess defined by a pair of surfaces at right angles to each other. The metal seat comprises a rear body portion of a generally uniform thickness between parallel planar faces or surfaces and acting in a manner similar to a Belleville spring. A lip about the inner circumference of the metal seat body portion is spaced from a rear planar shoulder of the recess under low pressure conditions but engages the ball valve member in sealing relation.

A high pressure bearing portion of the metal seat extends from the body portion in a direction longitudinally of the flow passage and is spaced from the ball valve member at low pressure conditions but engages the ball valve member under high pressure conditions to provide a sealing relation while also acting as a stop for limiting floating movement of the ball valve member. A relatively small thickness connecting portion of the seat which extends between the body portion and the bearing portion flexes upon the ball valve member engaging the bearing portion at high pressure conditions and exerts a seating force against the body portion for tightly sealing the rear surface of the body portion against the rear shoulder of the recess in metal-to-metal relation. The bearing portion of the metal seat is spaced from the ball valve member a distance less the spacing of the lip from the shoulder of the recess thereby to protect the lip from excessive force exerted by the ball valve member under very high fluid pressures. As indicated, the body portion of the metal seat acts as a Belleville spring and its inner lip provides sealing against the ball valve member at low fluid pressures as low as around 1 psi while spaced from the adjacent shoulder of the recess.

Another feature is in the stem mounting means in which aligned openings in the valve body and the outer plate for receiving the stem include an inner packing about the stem and an adjacent Belleville washer exerting a continuous generally uniform compressive loading against the packing. The opening in the outer plate outwardly of the Belleville washer and packing has an outer thrust bearing therein about the stem and is compressed independently of the packing under a predetermined light loading between a stem shoulder and the outer plate by an adjusting nut threaded onto the stem. The thrust bearing may be easily inserted or replaced without disassembly of the packing and is not exposed to lading within the valve chamber since mounted outwardly of the packing.

It is an object of this invention to provide a one piece metal seal for a floating ball valve which functions in a manner generally similar to a Belleville spring and fits within a recess in the valve body formed between a pair of surfaces at right angles to each other.

It is a further object of the invention to provide such a one piece metal seat for a floating ball valve in which the seat has a body portion of generally uniform thickness which includes a low pressure flexible lip about its inner circumference for sealing against the ball valve member at low fluid pressures and a high pressure flexible bearing portion extending from the body portion for sealing at high fluid pressures while spaced from the ball valve member at low fluid pressures.

Another object of this invention is to provide an improved stem mounting means for a floating ball valve utilizing a Belleville spring for exerting a compressive loading against an inner packing, and an outer thrust bearing outwardly of the Belleville spring and packing positioned between a shoulder on the stem and an outer plate.

Other objects, features and advantages of the invention will become more apparent after referring to the following specification and drawings.

DESCRIPTION OF THE INVENTION

Figure 2:
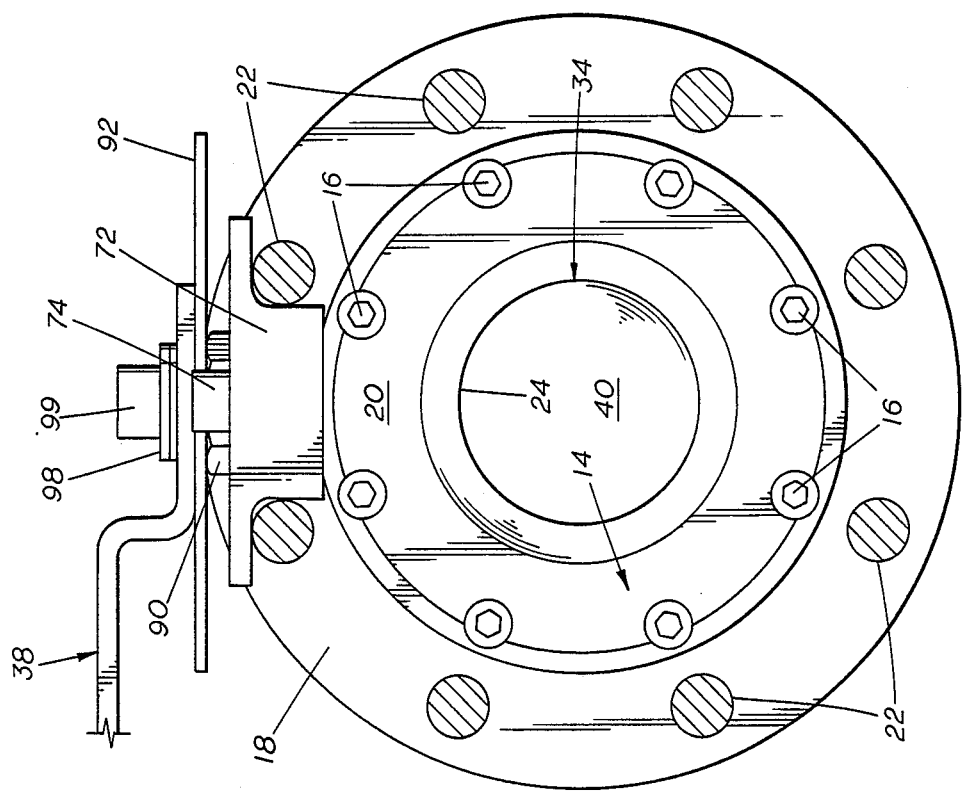
FIG. 2 is an end elevation of the ball valve structure shown in FIG. 1 taken generally along line 2—2 of FIG. 1.
Figure 1:
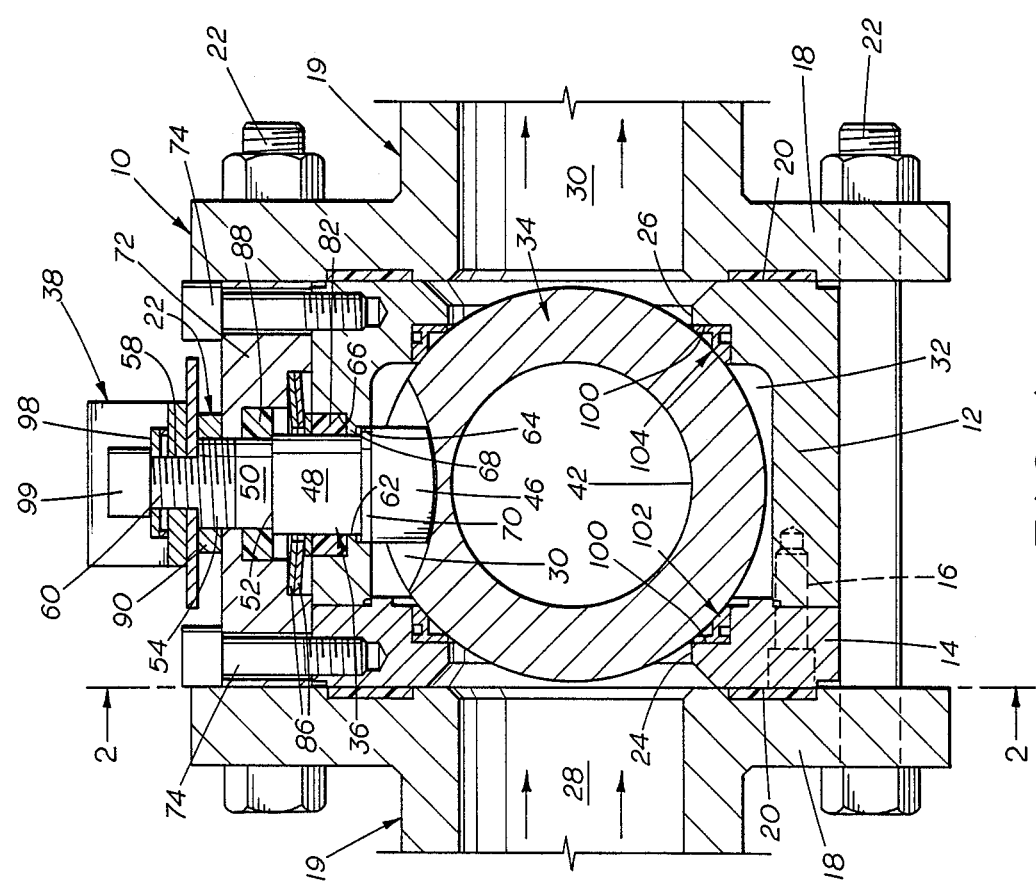
FIG. 1 is a longitudinal section view of a ball valve structure comprising the present invention.
Figure 3:
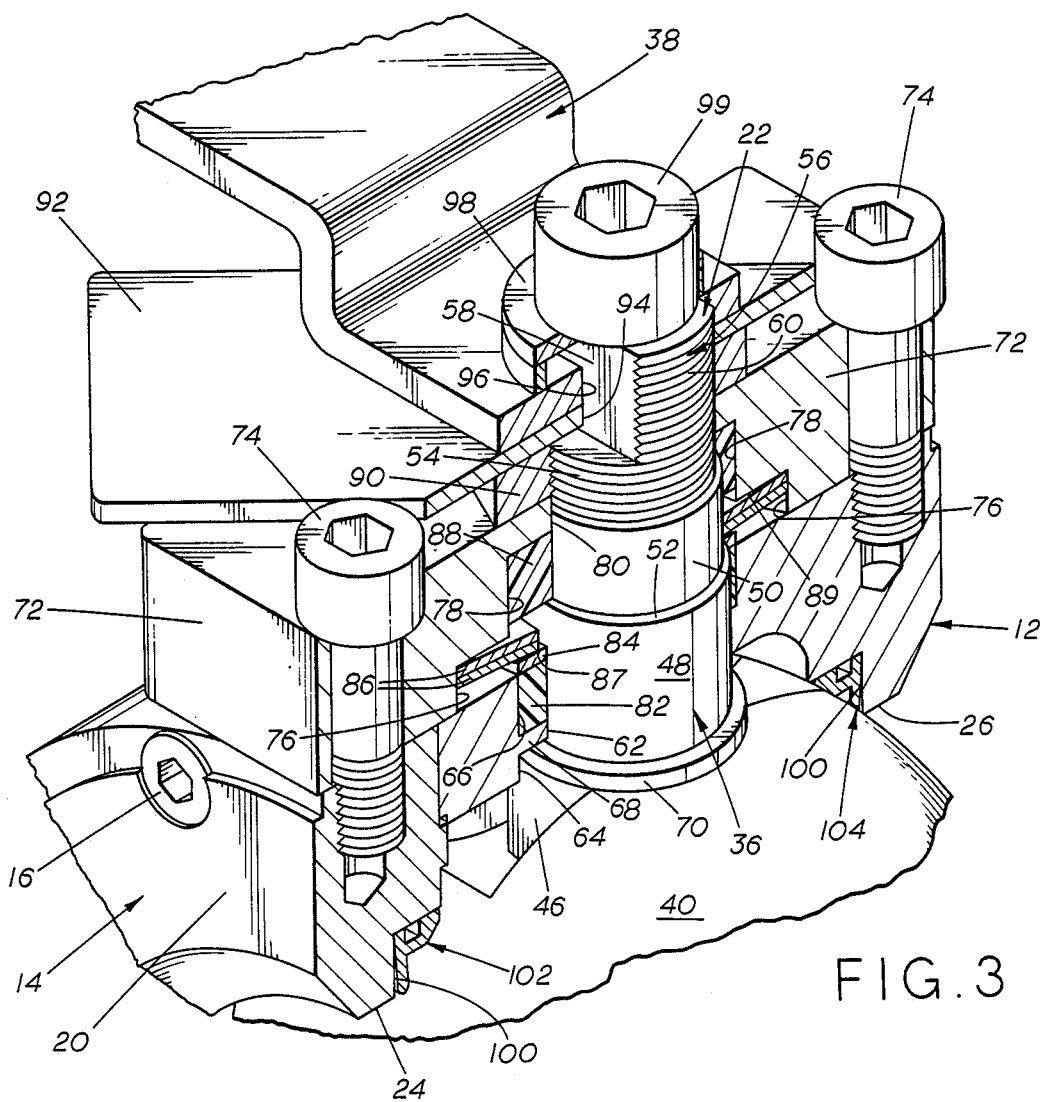
FIG. 3 is an enlarged sectional view in perspective of the upper portion of the valve illustrating the stem and adjacent parts.

Referring now to the drawings for a better understanding of this invention, a spherical plug or ball valve comprising this invention is indicated generally at 10 including a main body portion 14 and an end body portion 12 by a plurality of threaded bolts 16. For connecting ball valves or ball valve structure 10 within a flowline, flanges 18 of a flowline 19 fit on opposed ends 20 of body portions 12 and 14 and nut and bolt combination 22 clamp ball valve structure 10 tightly therebetween.

Body portion 14 has an inlet opening 24 and body portion 12 has an outlet opening 26. An inlet flow passage is indicated at 28 and an outlet flow passage is indicated at 30. Body portions 12 and 14 define an enlarged diameter valve chamber at 32 and a ball valve member 34 is mounted within chamber 32 for floating movement. A stem generally indicated at 36 has a handle 38 mounted thereon and is adapted to rotate ball valve member 34 between open and closed positions relative to flow line 19.

Ball valve member 34 has a spherical outer surface 40 and a central bore 42 therethrough which is in axial alignment with the longitudinal axis of flow passages 28 and 30 in open position. A slot 44 is provided in the upper surface of ball member 34. Stem 36 has a lower end 46 fitting within slot 30 and permitting longitudinal movement of ball member 34 in the closed position thereof. Coacting flats defined by slot 44 and lower end 46 effect rotation of ball member 34 upon rotation of stem 36.

Stem 36 includes an intermediate large diameter stem section 48 adjacent lower end 46, an intermediate diameter stem section 50 adjacent stem section 48 defining an annular shoulder 52 therebetween a cylindrical threaded section 54 adjacent stem section 50, and an upper end threaded section 56 adjacent cylindrical threaded section 54. Upper end threaded section 56 has a pair of opposed planar or flat surfaces 58 connected by arcuate externally threaded surfaces 60.

Valve body portion 12 has an upper opening or bore receiving valve stem 36 defining a small diameter intermediate portion 62, an intermediate diameter inner portion 64, and an enlarged diameter outer portion 66. A flange 68 is formed between intermediate bore portion 64 and large diameter bore portion 66. A collar 70 integral with stem 36 is spaced from flange 68 and remains spaced from flange 68 even under the application of high fluid pressures within valve chamber 32.

For holding stem 36 within body portion 12 and slot 30, an outer clamp plate 72 is secured to body portion by a plurality of threaded bolts 74. Plate 72 has a bore therethrough defining an inner large diameter bore portion 78, and an outer small diameter bore portion 80. For sealing about stem 36, a packing 82 fits within enlarged diameter bore portion 66 of body portion 12 about large diameter stem section 48. A follower 84 is positioned over the outer end of packing and a pair of Belleville washers 86 fitting within large diameter bore portion 76 of plate 72 are positioned between follower 84 and plate 72 for continuously exerting a downward or inner force against follower 84. Washers 86 have inner marginal portions 87 exerting a downward force on follower 84 and outer marginal portions 89 exerting an opposed force on plate 72 with follower 84 compressing packing 82 between shaft 36 and body portion 12. Washers 86 are of an outer diameter substantially larger than the outer diameter of packing 82 and exert a pressure on packing 82 greater than the maximum pressure within valve chamber 32 thereby to provide an inner compressive force against packing 82 at all times.

For exerting a downward or inward loading on stem 36, a thrust ring 88 is mounted within intermediate bore portion 78 of plate 72 and fits against shoulder 52. Thrust ring 88 may be formed of a suitable plastic material, such as polytetrafluoroethylene, which will melt or sublimate at a temperature of about 700° F. A nut 90 is threaded onto stem 36 over plate 72 for maintaining a predetermined relationship between thrust ring 88 and shoulder 52. Since stem 36 is rotated relative to thrust ring 88, a relative light loading of thrust ring 88 is normally provided. A stop plate 92 has a generally rectangular opening 94 thereon which receives stem 36 and rotates with stem 36 with plate 58 of stem 36. A suitable washer 98 and spacer fit over handle 38 and a securing bolt 99 is threaded within an internally threaded opening in the extending end of stem 36 for securing handle 38 thereon. Stop plate 92 engages bolts 74 at the fully open and fully closed positions of ball valve member 34.

Follower 84 exerts a continuously and generally uniform loading against packing 82 even in the event of wear on packing 82 as a result of the force exerted by Belleville springer 86. Thrust ring 88 is positioned outwardly of packing 82 and thus controls the position of stem 36 independently of the force applied to packing 82 by Belleville spring 86. Further, thrust ring 88 limits the outward movement of stem 36 upon high fluid pressures in valve chamber 32 and prevents contact of collar 70 with flange 68. However, when thrust ring 88 is consumed by high temperatures, such as may be generated by a fire or the like, stem 36 may be moved upwardly by high pressure within valve chamber 32 with stem collar 70 contacting flange 68.

Cap screws 74 hold plate 72 tightly against body portion 12 and nut 90 is lightly tightened for providing the desired frictional contact between shoulder 52 and thrust ring 88 upon rotation of ball valve member 34 between open and closed positions. Thus, the compressive loading of thrust ring 88 can be increased independently of and without compressing packing 82. Also, thrust ring 88 can easily be inserted or replaced without removal of packing 82 and is not exposed to ladings within valve chamber 32 which might be corrosive.

Recesses 100 adjacent valve chamber 32 are provided in the valve body about inlet flow passage 28 and outlet flow passage 30. An annular upstream metal seat 102 is mounted in recess 100 about inlet flow passage 28 and an annular downstream metal seat 104 is mounted in recess 100 about outlet flow passage 30. Recesses 100 and seats 102, 104 are generally identical and for the purpose of illustration, only the downstream seat 104 is described in detail as shown in FIGS. 4 and 5.

Figure 4:
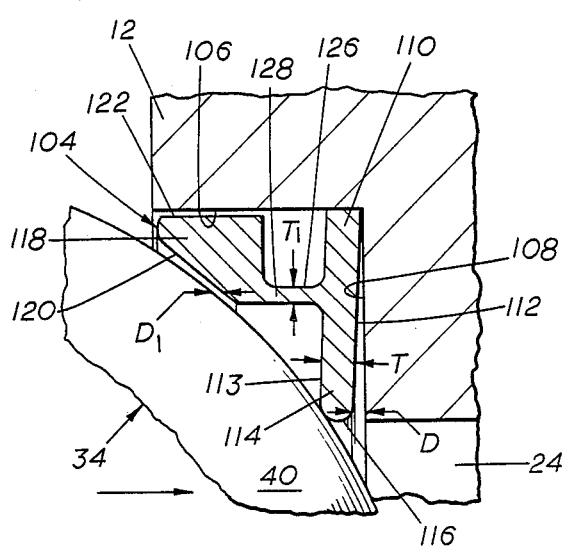
FIG. 4 is an enlarged fragment of FIG. 1 showing the ball valve member in sealing engagement with the metal seat under a low fluid pressure condition.
Figure 5:
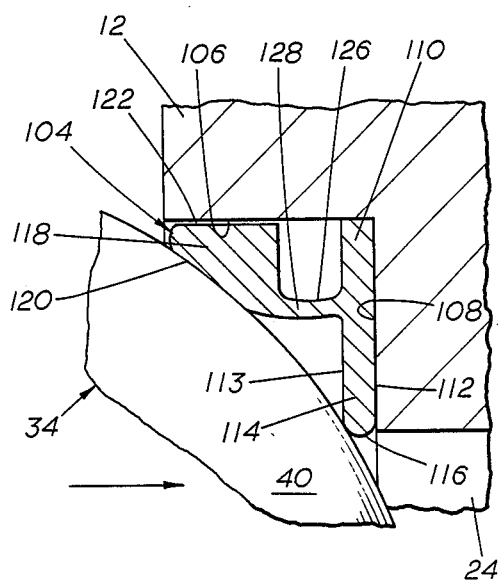
FIG. 5 is a view similar to FIG. 4 but showing the ball valve member in engagement with the metal seat under a high fluid pressure condition.

Referring now particularly to FIGS. 4 and 5, recess 110 is defined by an outer peripheral surface 106 which extends in a concentric relation to the longitudinal axis of the associated flow passage and a radial planar surface 108 forms a shoulder extending perpendicularly to surface 106. Metal seat 104 of a one-piece metal construction fits within recess 100 adjacent surfaces 106, 108 and comprises a body portion 110 of a generally uniform thickness T between generally parallel planar surfaces 112 and 113 which extend in a generally radial direction.

Rear planar surface 112 provides a sealing surface against shoulder 108 which at low fluid pressure seals generally at the corner of recess 100 as shown in FIG. 4, but at high fluid pressure seals along substantially the entire face of shoulder 108 as shown in FIG. 5. Body portion 110 acts in a manner similar to a Belleville spring and has a lip 114 at its inner circumference which is rounded at 116 for engaging spherical surface 40 of ball valve member 34. Lip 114 is spaced a distance D from the opposed shoulder 108 during normal operation in the open position of valve member 34 and during low fluid pressure operation in the closed position of ball valve member 34. A high pressure seat or bearing portion 118 of metal seat 104 is connected to body portion 110 and has an arcuate bearing or sealing surface 120 adapted to engage adjacent spherical surface 40 of ball valve member 34 under high fluid pressure conditions. Seat portion 118 has an outer circumferential surface 122 in opposed relation to outer periphery 106 and arcuate sealing surface 120 is of a contour generally the same as the adjacent spherical surface 40 of ball valve member 34. At low pressure conditions, ball valve member 34 is spaced a distance D1 from bearing surface 120 in axial direction parallel to the longitudinal axis of flow passages 28 and 30 as shown in FIG. 4. Distance D1 under all conditions of operation is less than distance D to act as a stop for ball valve member 34 to minimize wear or damage to lip 114 in forcing lip 114 against shoulder 108. For example, for a ball valve of four inches internal diameter D1 may be 0.005 inch and D may be 0.008 inch. In any event, D would be at least 0.001 inch greater than D1.

An outer annular groove 126 in seat 34 defines a connecting portion 128 of seat 34 extending between bearing portion 104 and body portion 110 in a direction generally parallel to the longitudinal axis of the flow passages 28 and 30. Connecting portion 128 is flexible and preferably has a generally uniform thickness T1 between around 25% and 65% of the thickness T of body portion 110 with an optimum thickness of around 45% of thickness T. Thus, under high pressure conditions as shown in FIG. 5, connecting portion 128 flexes but yet has sufficient rigidity to exert a strong force against body portion 110 for urging rear sealing surface 112 into tight sealing relation against shoulder 108.

As shown in FIG. 4 for a low pressure condition, such as 50 psi for example, rounded end 116 is in substantially line contact relation with spherical surface 40 of ball valve member 34 with lip 114 spaced a distance D from adjacent recess shoulder 108, and bearing surface 120 is spaced a distance D1 from the adjacent spherical surface 40 of ball valve member 34. Body portion 110 is in metal-to-metal sealing relation with shoulder 108 adjacent the corner of recess 100 formed at the juncture of shoulder 108 with outer circumferential surface 106.

As shown in FIG. 5 for a high pressure condition, such as 1000 psi, for example, floating ball valve member 34 in closed position moves downstream against lip 114 to urge lip 114 rearwardly with ball valve member 34 contacting bearing surface 120 before lip 114 is pressed tightly against shoulder 108. Further, ball valve member 34 through bearing portion 104 and connecting portion 128 urges the rear face or surface 112 of body portion 110 into tight metal-to-metal sealing relation with shoulder 108 with connecting portion 128 being slightly flexed. The higher the fluid pressure acting against ball valve member 34, the higher the sealing and seating forces exerted against and by metal seal 104 against shoulder 108. Metal seal 104 may be formed of various types of corrosion resistant metallic materials, such as a titanium, for example, which has a modulus of elasticity of around 15 million.

Thus, metal seat 104 while of a substantial strength is relatively flexible in a radial direction between lip 114 and seat portion 118 and will seal adequately even with substantial manufacturing tolerances in shoulder 108 and outer peripheral surface 106 of recess 100. Upon the exertion of a high fluid pressure against ball valve member 34, bearing surface 120 is contacted by ball valve member 34 before lip 114 engages shoulder 108 to restrain the force exerted against low pressure lip 114 by ball valve member 34. Connecting portion 128 transmits the force to body portion 110 for providing a tight sealing force which increases in relation to an increase in fluid pressure. Metal seat 104 is particularly adapted for fitting within a recess defined by a pair of body surfaces at right angles to each other.

A secondary stem seal is provided by collar 70 against flange 68 when high temperature consumes or deteriorates thrust bearing or ring 88 as internal pressure acting against stem 36 forces collar 70 against flange 68 to provide metal to metal engagement.

While a preferred embodiment of the present invention has been illustrated in detail, it is apparent that modifications and adaptations of the preferred embodiment will occur to those skilled in the art. However, it is to be expressly understood that such modifications and adaptations are within the spirit and scope of the present invention as set forth in the following claims.

What is claimed is:

1. In a ball valve having a valve body chamber with a floating ball valve member mounted therein for movement between open and closed positions, and an annular recess about a flow passage in the valve body adjacent the flow chamber defining an outer circumferential surface and an adjacent planar shoulder extending in a generally radial direction;
   an improved one piece annular metal seat fitting within said annular recess about said flow passage adapted for contacting the adjacent spherical surface of the floating ball valve member, said metal seat comprising:
   a body portion of a generally uniform thickness extending in a generally radial direction in opposed relation to the adjacent planar shoulder and defining an inner low pressure lip about its inner circumference contacting the adjacent spherical surface of the floating ball member in sealing relation during the entire operation of said ball valve; and
   a bearing portion integrally connected to said body portion and extending therefrom in a direction generally parallel to the longitudinal axis of the flow passage, said bearing portion having a seat adjacent the spherical surface of the floating ball member, said seat being spaced from said spherical surface under low pressure operation of said ball valve and contacting said spherical surface in bearing relation under high pressure operation of said valve.

2. In a ball valve as set forth in claim 1;
   said body portion of said metal seat acting in a manner similar to a Belleville spring with said inner lip being spaced from said opposed shoulder under low pressure operation and said body portion sealing in metal to metal relation against said shoulder adjacent the corner of said recess formed at the juncture of said shoulder and said outer circumferential surface thereof.

3. In a ball valve as set forth in claim 2;
said lip being spaced from said shoulder a distance less than the spacing of said ball valve member from said bearing portion in an axial direction parallel to the longitudinal axis of said flow passage so that said bearing portion is contacted by said ball valve member prior to the contact of said lip against said shoulder.

4. In a ball valve as set forth in claim 1;
said improved metal seat including a connecting portion between said bearing portion and said body portion extending in a direction generally parallel to the longitudinal axis of the flow passage, said connecting portion being of a thickness less than the thickness of said body portion.

5. In a ball valve as set forth in claim 4;
said connecting portion being of a generally uniform thickness between around 25% and 65% of the thickness of said body portion.

6. In a ball valve as set forth in claim 5;
said improved metal seat having an outer annular groove about its outer circumference between said bearing portion and said body portion, said connecting portion defining the bottom of said groove.

7. In a ball valve having a valve body chamber with a floating ball valve member mounted therein for movement between open and closed positions, and an annular recess about a flow passage in the valve body adjacent the flow chamber defining an outer circumferential surface and an adjacent planar shoulder extending in a generally radial direction;
an improved one piece annular metal seat fitting within said annular recess about said flow passage adapted for contacting the adjacent spherical surface of the floating ball valve member, said metal seat comprising:
a body portion of a generally uniform thickness extending in a generally radial direction in opposed relation to the adjacent planar shoulder and defining an inner low pressure lip about its inner circumference contacting the adjacent spherical surface of the floating ball member in sealing relation during the entire operation of said ball valve, said body portion of said metal seat acting in a manner similar to a Belleville spring with said inner lip being spaced from said opposed shoulder under low pressure operation and said body portion sealing in metal to metal relation against said shoulder adjacent the corner of said recess formed at the juncture of said shoulder and said outer circumferential surface thereof; and
a bearing portion integrally connected to said body portion and extending therefrom in a direction generally parallel to the longitudinal axis of the flow passage, said bearing portion having a substantially conforming seat surface adjacent the spherical surface of the floating ball member, said conforming seat surface being spaced from said spherical surface under low pressure operation of said ball valve a distance less than the spacing of said lip from said shoulder and contacting said spherical surface in bearing relation under high pressure operation of said valve prior to contact of said lip against said shoulder.

8. In a ball valve as set forth in claim 7;
said improved metal seat including a connecting portion between said bearing portion and said body portion extending in a direction generally parallel to the longitudinal axis of the flow passage, said connecting portion being of a thickness less than the thickness of said body portion.

9. In a ball valve as set forth in claim 8;
said connecting portion being of a generally uniform thickness between around 25% and 65% of the thickness of said body portion.

* * * * *